(12) United States Patent
Nakayama et al.

(10) Patent No.: US 10,355,307 B2
(45) Date of Patent: Jul. 16, 2019

(54) ALUMINUM SECONDARY BATTERY AND ELECTRONIC DEVICE

(71) Applicant: Murata Manufacturing Co., Ltd., Kyoto (JP)

(72) Inventors: Yuri Nakayama, Kanagawa (JP); Hideki Kawasaki, Kyoto (JP); Hiroyuki Morioka, Kanagawa (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 529 days.

(21) Appl. No.: 14/438,199

(22) PCT Filed: Oct. 9, 2013

(86) PCT No.: PCT/JP2013/077498
§ 371 (c)(1),
(2) Date: Apr. 23, 2015

(87) PCT Pub. No.: WO2014/069200
PCT Pub. Date: May 8, 2014

(65) Prior Publication Data
US 2015/0280279 A1    Oct. 1, 2015

(30) Foreign Application Priority Data

Oct. 30, 2012  (JP) ................................ 2012-239159

(51) Int. Cl.
*H01M 10/054* (2010.01)
*H01M 10/0567* (2010.01)
(Continued)

(52) U.S. Cl.
CPC ......... *H01M 10/054* (2013.01); *H01M 4/131* (2013.01); *H01M 4/137* (2013.01);
(Continued)

(58) Field of Classification Search
CPC .... H01M 10/054; H01M 4/137; H01M 4/463; H01M 4/602; H01M 4/604; H01M 4/608; H01M 10/0567–0569
See application file for complete search history.

(56) References Cited

U.S. PATENT DOCUMENTS

| | | | | |
|---|---|---|---|---|
| 4,407,907 A | * | 10/1983 | Takamura | ............ G01N 27/404 |
| | | | | 429/505 |
| 2012/0244447 A1 | * | 9/2012 | Suzuki | .................. H01M 12/06 |
| | | | | 429/405 |
| 2012/0270116 A1 | * | 10/2012 | Cho | ...................... H01M 12/06 |
| | | | | 429/405 |

FOREIGN PATENT DOCUMENTS

JP   HEI 06-052898 A    2/1994
JP   HEI 06-293991 A   10/1994
(Continued)

*Primary Examiner* — Ula C Ruddock
*Assistant Examiner* — Thomas H. Parsons
(74) *Attorney, Agent, or Firm* — Chip Law Group

(57) ABSTRACT

An aluminum secondary battery includes a positive electrode 11, a negative electrode 12, and an electrolyte, wherein the positive electrode 11 includes an anion receptor such as polyaniline, the negative electrode 12 includes aluminum or an aluminum alloy, the electrolyte includes an aluminum salt, a sulfone, and a solvent with a dielectric constant of 20 or less, wherein the aluminum salt is typically $AlCl_3$ or the like, the sulfone is typically ethyl n-propyl sulfone or the like, and the solvent with a dielectric constant of 20 or less is typically toluene or the like.

12 Claims, 10 Drawing Sheets

(51) Int. Cl.
    *H01M 10/0569*     (2010.01)
    *H01M 4/46*     (2006.01)
    *H01M 4/60*     (2006.01)
    *H01M 4/131*     (2010.01)
    *H01M 4/137*     (2010.01)
    *H01M 4/485*     (2010.01)
    *H01M 4/505*     (2010.01)
    *H01M 4/525*     (2010.01)
    *H01M 10/0568*     (2010.01)
    *H01M 4/02*     (2006.01)

(52) U.S. Cl.
    CPC ............ *H01M 4/463* (2013.01); *H01M 4/485* (2013.01); *H01M 4/505* (2013.01); *H01M 4/525* (2013.01); *H01M 4/602* (2013.01); *H01M 4/604* (2013.01); *H01M 4/608* (2013.01); *H01M 10/0567* (2013.01); *H01M 10/0569* (2013.01); *H01M 10/0568* (2013.01); *H01M 2004/028* (2013.01)

(56)     References Cited

FOREIGN PATENT DOCUMENTS

| | | |
|---|---|---|
| JP | HEI 09-120816 A | 5/1997 |
| JP | HEI 09-259892 A | 10/1997 |
| JP | 2003-100347 A | 4/2003 |
| JP | 2006-228605 A | 8/2006 |
| JP | 2012-089410 A | 5/2012 |

\* cited by examiner

ALUMINUM SECONDARY BATTERY AND ELECTRONIC DEVICE

TECHNICAL FIELD

The present disclosure relates to an aluminum secondary battery and an electronic device using the aluminum secondary battery.

BACKGROUND ART

Compact electronic devices such as portable terminal devices, widely spread in recent years, have been required to be smaller and lighter and have longer life. Accordingly, batteries as power sources for such devices, specifically, secondary batteries capable of producing a high energy density with a small size and a light weight, have been developed. Recently, the application of secondary batteries has been studied not only for compact electronic devices but also for large electronic devices such as cars.

Secondary batteries based on various charge-discharge principles have been proposed. Among them, attention has focused on aluminum secondary batteries based on aluminum deposition-dissolution reaction. This is because aluminum has a high ionization tendency and thus can produce a large quantity of electricity per unit volume through oxidation-reduction reaction. In other words, aluminum is a highly promising material for forming electrodes or as a charge carrier.

An aluminum secondary battery includes a positive electrode, a negative electrode, and an electrolyte including an aluminum salt and a solvent. The composition of the electrolyte, which functions as a medium for charge-discharge reaction, has a great effect on battery performance. Therefore, a variety of studies have been performed on the electrolyte.

For example, alkyl sulfone such as dimethylsulfone is used in the electrolyte in order to achieve high capacity and long life (see, for example, Patent Document 1). In this case, an organic solvent such as a cyclic or chain carbonate or a cyclic or chain ether is used.

In order to reduce polarization during discharge, an aluminum salt such as aluminum chloride and an organic halide such as trimethylphenylammonium chloride are used together in the electrolyte (see, for example, Patent Documents 2 and 3). In this case, an organic solvent such as 1,2-dichloroethane is used.

To put aluminum secondary batteries to practical use, it is necessary to allow aluminum deposition-dissolution reaction to proceed smoothly and sufficiently even at relatively low temperature (e.g., room temperature). In conventional aluminum secondary batteries, however, aluminum deposition-dissolution reaction can proceed smoothly and sufficiently only at relatively high temperature (e.g., 50° C. or higher), and the efficiency of the reaction is also low, which has room for improvement in terms of practicality.

Thus, the applicant has previously proposed that an electrolyte for use in an aluminum secondary battery should include an aluminum salt, alkyl sulfone, and a solvent with a dielectric constant of 20 or less so that the electrolyte can reduce the temperature at which aluminum deposition-dissolution reaction proceeds (see Patent Document 4).

CITATION LIST

Patent Documents

Patent Document 1: Japanese Patent Application Laid-Open No. 2003-100347

Patent Document 2: Japanese Patent Application Laid-Open No. 06-293991

Patent Document 3: Japanese Patent Application Laid-Open No. 09-259892

Patent Document 4: Japanese Patent Application Laid-Open No. 2012-89410

SUMMARY OF THE INVENTION

Problems to be Solved by the Invention

Compact electronic devices often use coin cells, whose casing member and the like are made of a metal material such as stainless steel (SUS). If aluminum secondary batteries can also be provided in the form of coin cells, they can be expected to be used widely. Unfortunately, conventional electrolytes for use in aluminum secondary batteries operable at room temperature are highly corrosive and can corrode metal materials such as SUS. Therefore, the use of such electrolytes makes it difficult to produce coin cells whose casing member and the like are made of a metal material such as SUS.

The electrolyte proposed in Patent Document 4 is not corrosive to metal materials such as SUS. Therefore, the use of this electrolyte makes it possible to provide aluminum secondary batteries in the form of coin cells whose casing member and the like are made of a metal material such as SUS. However, there has been a problem in that it is particularly difficult to increase the charge-discharge efficiency of aluminum secondary batteries using oxide positive electrodes.

Thus, an object to be achieved by the present disclosure is to provide a high-performance aluminum secondary battery that can be provided in the form of a coin cell, whose casing member and the like are made of a metal material such as SUS, and can be charged and discharged efficiently, and to provide a high-performance electronic device using such an aluminum secondary battery.

The object and other objects will be made clear by the following description with reference to the attached drawings.

Solutions to Problems

To solve the problems, the present disclosure is directed to an aluminum secondary battery including: a positive electrode; a negative electrode including at least aluminum; and an electrolyte, wherein the electrolyte includes an aluminum salt, a sulfone, and a solvent with a dielectric constant of 20 or less, and the positive electrode includes an anion receptor.

The present disclosure is also directed to an electronic device including at least one aluminum secondary battery which includes the above aluminum secondary battery according to the present disclosure.

The present disclosure is also directed to an electronic device configured to receive electric power from an aluminum secondary battery which includes the above aluminum secondary battery according to the present disclosure.

The present disclosure is also directed to a battery pack including: an aluminum secondary battery; a control unit configured to perform control for the aluminum secondary battery; and a casing configured to contain the aluminum secondary battery, wherein the aluminum secondary battery includes the above aluminum secondary battery according to the present disclosure.

The present disclosure is also directed to an electrically driven vehicle including: an converter configured to receive electric power from an aluminum secondary battery and convert the electric power to mechanical drive power for the vehicle; and a control device configured to process information about vehicle control based on information about the aluminum secondary battery, wherein the aluminum secondary battery includes the above aluminum secondary battery according to the present disclosure.

The present disclosure is also directed to a power system configured to receive electric power from an aluminum secondary battery and/or to supply electric power from an power source to the aluminum secondary battery, wherein the aluminum secondary battery includes the above aluminum secondary battery according to the present disclosure.

The present disclosure is also directed to a power source for use in power storage, the power source including an aluminum secondary battery and being configured to be connected to an electronic device to which electric power is to be supplied, wherein the aluminum secondary battery includes the above aluminum secondary battery according to the present disclosure.

Effects of the Invention

According to the present disclosure, the corrosion of metal materials such as SUS can be prevented by using the electrolyte including an aluminum salt, a sulfone, and a solvent with a dielectric constant of 20 or less, which makes it possible to provide coin cells whose casing member and the like are made of a metal material such as SUS. Oxide positive electrodes are generally used in conventional aluminum secondary batteries. In such secondary batteries, aluminum ions are strongly bonded to oxygen, and therefore, it is difficult to efficiently charge and discharge such secondary batteries. In contrast, the aluminum secondary battery of the present disclosure can be efficiently charged and discharged without such a problem because the positive electrode used in the aluminum secondary battery of the present discloser includes an anion receptor. Thus, the present disclosure makes it possible to provide high-performance aluminum secondary batteries that can be charged and discharged efficiently and can form coin cells whose casing member and the like are made of a metal material such as SUS. High-performance electronic devices, battery packs, electrically driven vehicles, power systems, and power sources for use in power storage can be produced using the high-performance aluminum secondary battery of the present disclosure.

MODE FOR CARRYING OUT THE INVENTION

Figure 1:
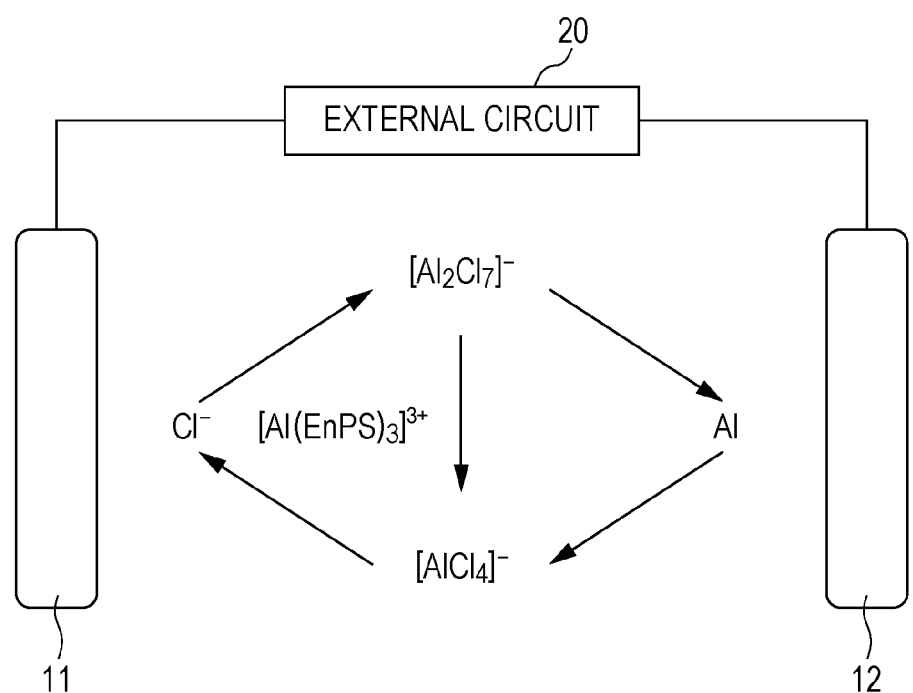
FIG. 1 is a schematic diagram showing an aluminum secondary battery of the present disclosure.

Basically, the electronic device of the present disclosure may be of any type. Examples of the electronic device of the present disclosure include both portable and stationary electronic devices, such as mobile phones, mobile devices (such as personal digital assistants (PDAs)), robots, personal computers (including both desktop and notebook computers), game machines, camera-integrated VTRs (videotape recorders), on-vehicle devices, home electric appliances, industrial products, etc.

In the battery pack of the present disclosure, the control unit is configured, for example, to control the charge and discharge, over discharge, or overcharge of the aluminum secondary battery.

In the electrically driven vehicle of the present disclosure, the converter is typically a motor that receives electric power from the aluminum secondary battery to generate mechanical drive power. The motor may also use regenerative energy. The control device is configured, for example, to process information about vehicle control based on the remaining power of the aluminum secondary battery. Examples of the electrically driven vehicle include electric cars, electric motorcycles, electric bicycles, railway vehicles, so-called hybrid cars, etc.

The power system of the present disclosure may be of any type using electric power, which also includes a simple power device. Examples of the power system include smart grids, home energy management systems (HEMS), vehicles, etc., which can also store electricity.

The power source of the present disclosure for use in power storage may be used in any applications. Basically, the power source of the present disclosure may be used in any power systems or devices, and may also be used, for example, in smart grids.

The description of the electronic device, battery pack, electrically driven vehicle, power system, and power source for use in power storage applies to the aluminum secondary battery of the present disclosure, unless contrary to the nature thereof.

As a non-limiting example, the aluminum secondary battery of the present disclosure or the aluminum secondary battery for use in the electronic device, battery pack, electrically driven vehicle, power system, or power source for use in power storage according to the present disclosure preferably includes an anion receptor with a structure designed to take in or release halogen upon oxidation-reduction reaction that occurs in the aluminum secondary battery when the battery is charged and discharged. Specifically, the anion receptor may be, for example, at least one selected from the group consisting of a p-type conductive polymer, a metal complex having a structure that allows halogen to be coordinated to or detached from the metal moiety, and a metal oxide having a structure that allows chlorine to be coordinated to or detached from the metal moiety.

The p-type conductive polymer may be at least one selected from the group consisting of polyaniline, polypyrrole, polyacetylene, polyparaphenylene, polythiophene, polyacene, and derivatives thereof.

The metal complex may be at least one selected from the group consisting of metalloporphyrin, wherein metal is V, Mn, Fe, Co, Ni, or Cu, metallophthalocyanine, derivatives thereof, and polymers thereof. The metal oxide may be at least one selected from the group consisting of $V_2O_3$, MnO, FeO, CoO, NiO, and $Cu_2O$.

The sulfone is typically an alkyl sulfone represented by $R_1R_2SO_2$, wherein $R_1$ and $R_2$ each represent an alkyl group, or an alkyl sulfone derivative. $R_1$ and $R_2$ may be of any type (with any number of carbon atoms and in any combination), which may be selected as needed. The number of carbon atoms in each of $R_1$ and $R_2$ is preferably 4 or less. The sum of the number of carbon atoms in $R_1$ and the number of carbon atoms in $R_2$ is preferably, but not limited to, 4 to 7. $R_1$ and $R_2$ may be each, for example, methyl, ethyl, n-propyl, isopropyl, n-butyl, isobutyl, sec-butyl, or tert-butyl.

Specifically, the alkyl sulfone may be, for example, at least one selected from the group consisting of dimethylsulfone (DMS), methyl ethyl sulfone (MES), methyl n-propyl sulfone (MnPS), methyl isopropyl sulfone (MiPS), methyl n-butyl sulfone (MnBS), methyl isobutyl sulfone (MiBS), methyl sec-butyl sulfone (MsBS), methyl tert-butyl sulfone (MtBS), ethyl methyl sulfone (EMS), diethylsulfone (DES), ethyl n-propyl sulfone (EnPS), ethyl isopropyl sulfone (EiPS), ethyl n-butyl sulfone (EnBS), ethyl isobutyl sulfone (EiBS), ethyl sec-butyl sulfone (EsBS), ethyl tert-butyl sulfone (EtBS), di-n-propylsulfone (DnPS), diisopropylsulfone (DiPS), n-propyl n-butyl sulfone (nPnBS), n-butyl ethyl sulfone (nBES), isobutyl ethyl sulfone (iBES), sec-butyl ethyl sulfone (sBES), and di-n-butylsulfone (DnBS). The alkyl sulfone derivative may be, for example, ethyl phenyl sulfone (EPhS).

The content of the solvent in the electrolyte is preferably from 30% by mole to less than 88% by mole. The molar ratio of the aluminum salt to the sulfone (the aluminum salt content/the sulfone content) is preferably from 4/5 to less than 7/3. The content of the solvent in the electrolyte is more preferably from 30% by mole to 84% by mole. The molar ratio of the aluminum salt to the sulfone is more preferably from 4/5 to 5/3. The solvent preferably has a dielectric constant of 10 or less.

The aluminum salt may be one or more of aluminum salts having any of a variety of anions shown below.

Specifically, the aluminum salt includes an aluminum ion ($Al^{3+}$) as a cation (positive ion) and an anion (negative ion). The anion may be, for example, a fluoride ion ($F^-$), a chloride ion ($Cl^-$), an iodide ion ($I^-$), a bromide ion ($Br^-$), a perchlorate ion ($ClO_4^-$), a tetrafluoroborate ion ($BF_4^-$), a hexafluorophosphate ion ($PF_6^-$), a hexafluoroarsenate ion ($AsF_6^-$), a perfluoroalkylsulfonate ion ($RfSO_3^-$), wherein Rf represents a perfluoroalkyl group), or a perfluoroalkylsulfonylimide ion ($(RfSO_2)_2N^-$). It will be understood that the anion may be an ion other than these ions.

The aluminum salt may also be a complex salt. In this case, the cation may be, for example, $[Al(CH_3CN)_6]^{3+}$, in which acetonitrile is coordinated to the aluminum ion, or $[Al(DMSO)_6]^{3+}$, in which dimethylsulfoxide (DMSO, $(CH_3)_2SO$) is coordinated to the aluminum ion. It will be understood that the cation in the complex salt may be an ion other than these ions.

Specifically, the aluminum salt may be an aluminum halide ($AlX_3$, wherein X is chlorine (Cl), bromine (Br), iodine (I), or the like). The aluminum halide is usually available, and the aluminum of the aluminum halide can easily undergo oxidation-reduction reaction.

One or more solvents with a dielectric constant of 20 or less (hereinafter referred to as "low-polarity solvents") may be used. The dielectric constant is the value measured at 25° C. The low-polarity solvent is less likely to affect the aluminum salt solvation. Therefore, the aluminum salt and the sulfone can be dispersed in the low-polarity solvent with less inhibition of the aluminum salt solvation. In addition, the viscosity of the electrolyte can be reduced, which also makes it easy to disperse the aluminum salt and the sulfone. If necessary, another type of solvent may also be used in addition to the low-polarity solvent. The low-polarity solvent should be an aprotic (low electron-donating) solvent with low dielectric properties.

The low-polarity solvent may be of any type, such as an aromatic hydrocarbon, an ether, a ketone, an acetic ester, a chain carbonate, a halide thereof, or other organic solvent. The aromatic hydrocarbon may be an aromatic ring compound or a hydrocarbon group-containing aromatic ring compound, and may be, for example, at least one selected from the group consisting of benzene, toluene, ethylbenzene, o-xylene, m-xylene, p-xylene, and 1-methylnaphthalene. The ether may be, for example, diethyl ether, tetrahydrofuran, or the like. The ketone may be, for example, 4-methyl-2-pentanone or the like. The acetic ester may be, for example, methyl acetate, ethyl acetate, or the like. The chain carbonate may be, for example, dimethyl carbonate, diethyl carbonate, ethyl methyl carbonate, or the like. The halide may be a compound derived from the aromatic hydrocarbon or other compounds by replacing at least one hydrogen atom with a halogen. The halide may be, for example, a fluoride or the like. The halide may also be derived from other compounds such as esters.

In particular, the low-polarity solvent preferably has the ability to sufficiently dissolve the aluminum salt and the sulfone. This is because in such a case, the aluminum salt and the sulfone can be uniformly dispersed so that a more advantageous effect can be obtained.

The dielectric constant of the low-polarity solvent is preferably 10 or less, more preferably 2.4 or less, which makes it easy to produce the advantageous function of the low-polarity solvent. The low-polarity solvent with a dielectric constant of 10 or less may be, for example, an aromatic hydrocarbon, a chain carbonate, or the like. The low-polarity solvent with a dielectric constant of 2.4 or less may be, for example, an aromatic hydrocarbon or the like.

Figure 2:
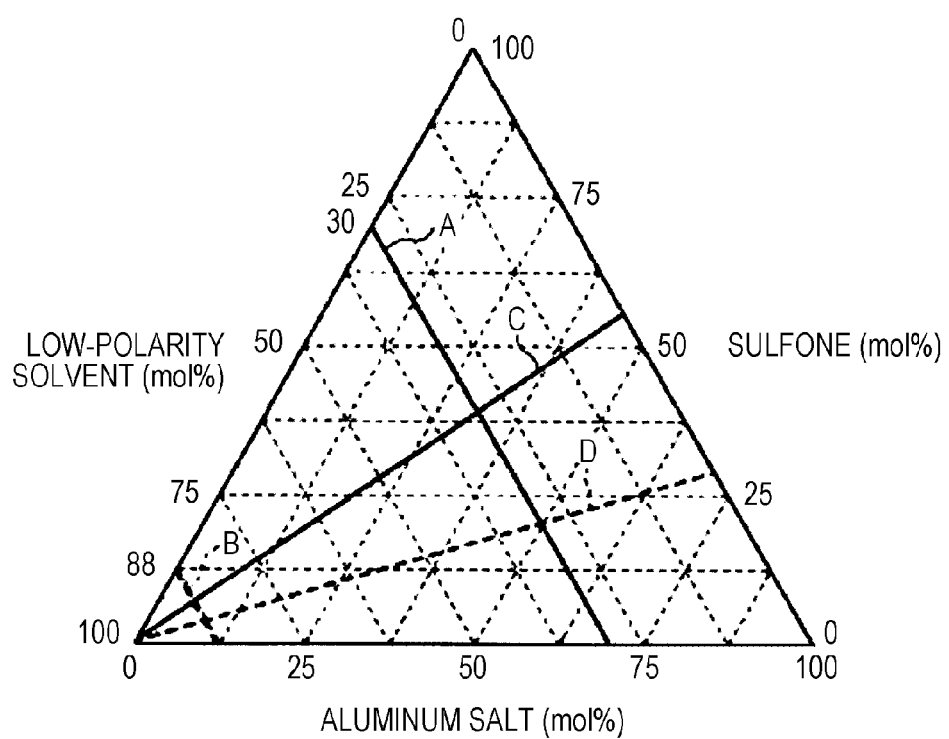
FIG. 2 is a triangular phase diagram showing the composition of an electrolyte used in an aluminum secondary battery of the present disclosure.

The contents of the aluminum salt, the sulfone, and the low-polarity solvent in the electrolyte will be described. FIG. 2 shows a triangular phase diagram for the composition of the electrolyte. In FIG. 2, solid line A indicates a low-polarity solvent content of 30% by mole, broken line B a low-polarity solvent content of 88% by mole, solid line C a molar ratio (of the content of the aluminum salt to the content of the alkyl sulfone) of 4/5, and broken line D a molar ratio of 7/3.

As shown in FIG. 2, the content of the low-polarity solvent in the electrolyte is preferably from 30% by mole to less than 88% by mole, more preferably from 30% by mole to 84% by mole. In this case, a larger amount of the aluminum salt can be dispersed in the lower-polarity solvent.

The mixing ratio of the aluminum salt to the sulfone, specifically, the molar ratio of the aluminum salt content (mol %) to the sulfone content (mol %) (the aluminum salt content/the sulfone content) is preferably from 4/5 to less than 7/3, more preferably from 4/5 to 5/3. When the low-polarity solvent satisfies the conditions, the aluminum salt and the sulfone can be mixed in a proper ratio, so that a larger amount of the aluminum salt can be dispersed in the low-polarity solvent.

In FIG. 2, therefore, the composition of the electrolyte, specifically, the contents of the aluminum salt, the sulfone, and the low-polarity solvent each preferably fall within the range surrounded by solid lines A and C and broken lines B and D. It should be noted that it is apparent from the above conditions that the range includes the points (contents) on solid lines A and C but does not include the points (contents) on broken lines B and D.

The electrolyte can be prepared, for example, as follows. Specifically, first, the aluminum salt, the sulfone, and the low-polarity solvent are mixed so that the aluminum salt and the sulfone are dispersed in the low-polarity solvent. In this case, the three materials may be added in any order. It is particularly preferred that the low-polarity solvent and the sulfone should be mixed and then the aluminum salt should be dispersed into the mixture. This is because in such a case, the generation of heat of reaction can be reduced and the amount of the dispersed aluminum salt tends to further increase. As the amount of the dispersed aluminum salt increases, the content of the aluminum salt in the electrolyte increases, so that a dimer of the aluminum salt becomes more likely to form. This makes it significantly easy to allow the aluminum salt to undergo oxidation-reduction reaction even when the temperature of the electrolyte is not raised.

When the electrolyte has a low-polarity solvent content of 30% by mole to less than 88% by mole and a molar ratio (of the aluminum salt content to the sulfone content) of 4/5 to less than 7/3, the aluminum is electrochemically activated with the sulfone, and the oxidation-reduction reaction of aluminum is less influenced by the low-polarity solvent, which makes it easy to allow the aluminum to undergo oxidation-reduction reaction smoothly and sufficiently. In addition, a dimer of the aluminum salt can easily form as the amount of the aluminum salt dispersed in the low-polarity solvent increases, so that the oxidation-reduction reaction of aluminum can proceed more easily than in the case that the low-polarity solvent does not satisfy the conditions of the content and molar ratio. This makes it significantly easy to allow the aluminum to undergo oxidation-reduction reaction, which makes it possible to lower the temperature at which the aluminum deposition-dissolution reaction proceeds. In other words, even if the temperature of the electrolyte is not raised excessively, the aluminum deposition-dissolution reaction can be allowed to proceed smoothly and sufficiently at room temperature. Specifically, the aluminum deposition-dissolution reaction can be successfully performed at 15° C. or higher, preferably at 20° C. or higher, more preferably at 25° C. or higher. In this case, the sulfone can also make the electrolyte less reactive, which makes it possible to prevent the electrolyte from corroding metal materials such as SUS.

Particularly when the low-polarity solvent is an aromatic hydrocarbon such as toluene, a higher effect can be obtained. In addition, when the $R_1$ and $R_2$ groups of the sulfone each have four or less carbon atoms or when the sulfone is ethyl n-propyl sulfone or the like, a higher effect can be obtained.

Hereinafter, modes for carrying out the present disclosure (hereinafter referred to as "embodiments") will be described. FIG. 1 is a schematic diagram showing an aluminum secondary battery according to an embodiment.

Aluminum Secondary Battery

The aluminum secondary battery includes a positive electrode 11, a negative electrode 12, and an electrolyte (not shown) in contact with the positive and negative electrodes 11 and 12. Typically, a separator is provided between the positive and negative electrodes 11 and 12, and the separator is impregnated with the electrolyte. During the operation of the aluminum secondary battery, an external circuit 20 is connected between the positive and negative electrodes 11 and 12.

The electrolyte includes an aluminum salt, a sulfone, and a solvent with a dielectric constant of 20 or less, in which the aluminum salt and the sulfone are dispersed or dissolved in the solvent. The sulfone in the electrolyte facilitates the solvation of the aluminum salt, which makes it easy to allow the aluminum to undergo electrochemical activation and thus oxidation-reduction reaction. In addition, the oxidizing properties of the electrolyte (the ability to oxidize materials other than the electrolyte) can be reduced. Therefore, the reactivity of the electrolyte can be reduced, so that the electrolyte can be less corrosive to a metal material such as SUS (a casing member, an electrode, a lead, etc.) when used with the metal material. If necessary, the electrolyte may contain materials other than the aluminum salt, the sulfone, and the solvent with a dielectric constant of 20 or less.

The positive electrode 11 is made of a material including an anion receptor. The anion receptor is, for example, at least one selected from the group consisting of a p-type conductive polymer, a metal complex having a structure that allows halogen to be coordinated to or detached from the metal moiety, and a metal oxide having a structure that allows chlorine to be coordinated to or detached from the metal moiety. The material used to form the positive electrode 11 optionally contains other materials such as a positive electrode binder and a positive electrode conductive agent in addition to the anion receptor. The positive electrode binder may be, for example, a polymer material such as polyvinylidene fluoride (PVDF) or polytetrafluoroethylene (PTFE). The positive electrode conductive agent may be, for example, a carbon material such as graphite, carbon black, acetylene black, or ketjen black. The positive electrode 11 is typically provided with a positive electrode-side collector. The positive electrode-side collector is made of, for example, aluminum, nickel (Ni), stainless steel, or the like.

The negative electrode 12 includes aluminum or an aluminum alloy as a negative electrode active material. For example, at least one element of silicon (Si), manganese (Mn), chromium (Cr), nickel, and copper (Cu) is used to form the aluminum alloy. The negative electrode 12 is typically provided with a negative electrode-side collector. The negative electrode-side collector is made of, for example, copper, nickel, stainless steel, or the like.

When a separator is provided between the positive and negative electrodes 11 and 12, the separator separates the positive and negative electrodes 11 and 12 from each other and allows aluminum ions to pass through it while preventing short circuit current, which would otherwise be caused by contact between these electrodes. For example, a porous film made of synthetic resin or ceramic is used to form the separator. The synthetic resin may be, for example, polytetrafluoroethylene, polypropylene, polyethylene, or the like. The separator may be a laminate of two or more different porous films.

Operation of Aluminum Secondary Battery

For example, the following charge-discharge reaction occurs in the aluminum secondary battery. During the charge, aluminum is deposited on the negative electrode 12 by a reduction reaction. On the other hand, during the discharge, aluminum is dissolved at the negative electrode 12 by an oxidation reaction, so that aluminum is leached from the negative electrode 12 into the electrolyte.

Example of Coin Cell Configuration

Figure 3:
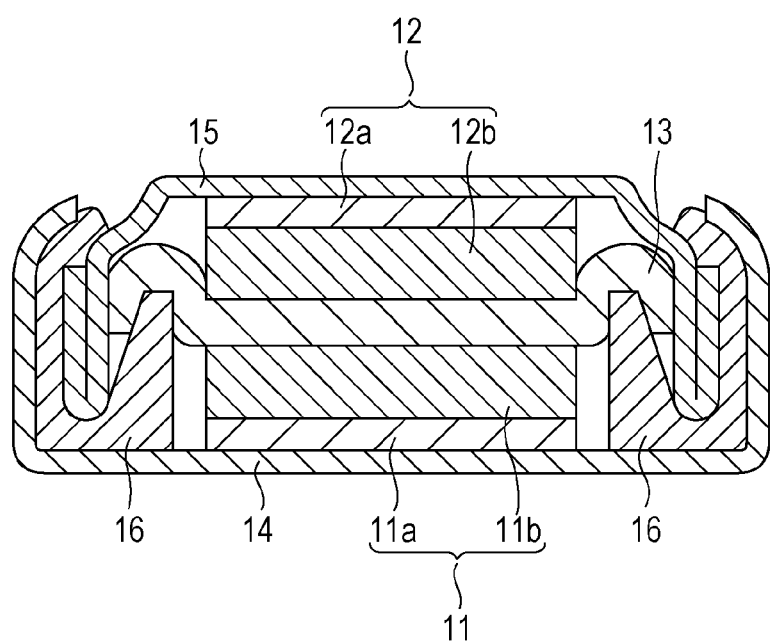
FIG. 3 is a schematic cross-sectional view showing an example of the aluminum secondary battery of the present disclosure fabricated in the form of a coin cell.

FIG. 3 is a schematic cross-sectional view showing an aluminum secondary battery including a coin cell.

The coin cell has a positive electrode 11 housed in a casing can 14 and a negative electrode 12 housed in a casing cup 15, wherein the casing can 14 and the casing cup 15 are swaged together with a separator 13 and a gasket 16 interposed therebetween.

The casing can 14 and the casing cup 15 are casing members provided to house the positive electrode 11, the negative electrode 12, and other components, and they are made of, for example, a metal material such as aluminum, an aluminum alloy, or stainless steel.

For example, the positive electrode 11 includes a positive electrode-side collector 11a and a positive electrode active material layer 11b, in which the positive electrode active material layer 11b is formed on one side of the positive electrode-side collector 11a. As mentioned above, the positive electrode-side collector 11a is made of, for example, Al, Ni, SUS, or the like. The positive electrode active material layer 11b includes an anion receptor as a positive electrode active material and optionally other materials such as a positive electrode binder and a positive electrode conductive agent as mentioned above.

For example, the negative electrode 12 includes a negative electrode-side collector 12a and a negative electrode active material layer 12b, in which the negative electrode active material layer 12b is formed on one side of the negative electrode-side collector 12a. As mentioned above, the negative electrode-side collector 12a is made of, for example, Cu, Ni, SUS, or the like. The negative electrode active material layer 12b is made of Al or an Al alloy.

As mentioned above, for example, a porous film made of synthetic resin, ceramic, or the like is used to form the separator 13. The separator 13 is impregnated with the electrolyte described above.

Method for Manufacturing Coin Cell

The coin cell is manufactured by the following procedure. Specifically, first, the positive electrode active material layer 11b including the positive electrode active material is formed on one side of the positive electrode-side collector 11a by coating method or the like, so that the positive electrode 11 is obtained. On the other hand, the negative electrode active material layer 12b including the negative electrode active material is formed on one side of the negative electrode-side collector 12a by coating method or the like, so that the negative electrode 12 is obtained. Subsequently, the positive electrode 11 is housed in the casing can 14, and the negative electrode 12 is housed in the casing cup 15. Finally, the casing can 14 and the casing cup 15 are swaged together with the electrolyte-impregnated separator 13 and the gasket 16 interposed therebetween. In this way, the coin cell is completed.

Example 1

An aluminum secondary battery of Example 1 was manufactured in the following manner.

The process of weighing and mixing reagents was performed in a glove box (Ar/dew point −80° C. to −90° C.) Using a stirrer, 2.0 grams of low-water-content toluene (manufactured by NACALAI TESQUE, INC.) and 0.77 grams of ethyl n-propyl sulfone (EnPS, manufactured by Toyo Kasei Kogyo Co., Ltd.) were mixed and stirred until a uniform mixture was obtained. Subsequently, 1.0 gram of aluminum chloride ($AlCl_3$, manufactured by Sigma-Aldrich Corporation) was dissolved in the mixture to form an electrolyte.

A positive electrode 11 was prepared in the following manner. Polyaniline and acetylene black (DENKA BLACK, manufactured by DENKI KAGAKU KOGYO KABUSHIKI KAISHA) were mixed using an agate mortar. PTFE was then added to the mixture and mixed again. The mixture prepared by this process was formed into a 100-μm-thick sheet using a roll press. Subsequently, a circular piece with a diameter φ of 15 mm was punched from the sheet and then pressure-bonded to a positive electrode-side molybdenum wire net collector to form a pellet-shaped positive electrode. The polyaniline used was a chlorine-doped, oxidized polyaniline (manufactured by Alfa Aesar).

The positive electrode 11 prepared as described above and a negative electrode 12 made of metallic aluminum were arranged to hold, between them, a separator 13 made of glass wool (GC-50, manufactured by Advantech Japan, Co., Ltd.) and not to be in contact with each other. The battery chamber surrounded by positive electrode-side and negative electrode-side stainless steel (SUS) collectors was then filled with the electrolyte, so that an aluminum secondary battery was obtained.

Example 2

An aluminum secondary battery of Example 2 was prepared as in Example 1, except that the polyaniline used was undoped oxidized polyaniline (manufactured by Sigma-Aldrich Corporation).

Example 3

An aluminum secondary battery of Example 3 was prepared as in Example 1, except that the polyaniline used was p-toluenesulfonic acid-doped, oxidized polyaniline (manufactured by Alfa Aesar).

Example 4

An aluminum secondary battery of Example 4 was prepared as in Example 1, except that the polyaniline used was undoped reduced polyaniline (manufactured by Sigma-Aldrich Corporation).

Cyclic voltammetry (CV) measurement was conducted at room temperature to evaluate the electrochemical properties of the aluminum secondary batteries of Examples 1 to 4. The measurement was started from the open circuit voltage (OCV). The potential of the positive electrode relative to the potential of the Al metal as the negative electrode was first increased to 1.7 V on the oxidation side, then decreased to 0 volts on the reduction side, and finally returned to the OCV (namely, the potential was changed in the following order: OCV→1.7 volts→0 volts→OCV). The potential sweep rate was 0.2 millivolts/second.

Figure 4:
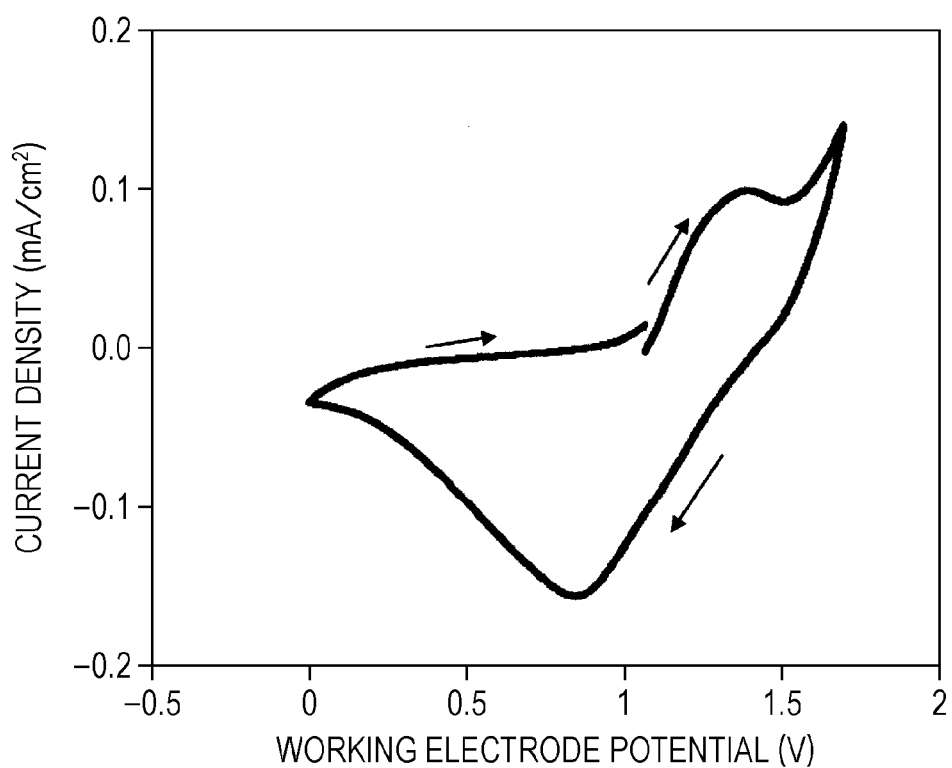
FIG. 4 is a graph showing the results of the CV measurement of an aluminum secondary battery of Example 1.

FIG. 4 is a graph showing the results of the CV measurement of the aluminum secondary battery of Example 1 using chlorine-doped, oxidized polyaniline. In FIG. 4, the horizontal axis represents the potential of the positive electrode relative to the potential of the Al metal of the negative electrode. FIG. 4 shows that a current was observed in the process involving a pair of oxidation and reduction reactions and the resulting battery can be reversibly charged and discharged. The oxidation (charge)-side peak and the reduction (discharge)-side peak are observed at about 1.35 volts and about 0.85 volts, respectively. Therefore, the voltage difference between charge and discharge is expected to be about 0.5 volts.

The aluminum secondary battery of Example 1 was subjected to a charge-discharge test. Since the polyaniline used was in an oxidized state, the test was started from discharge. At a current density of 0.1 milliamperes/cm$^2$, discharge to 0.05 volts and charge to 1.35 volts were repeatedly performed.

Figure 5:
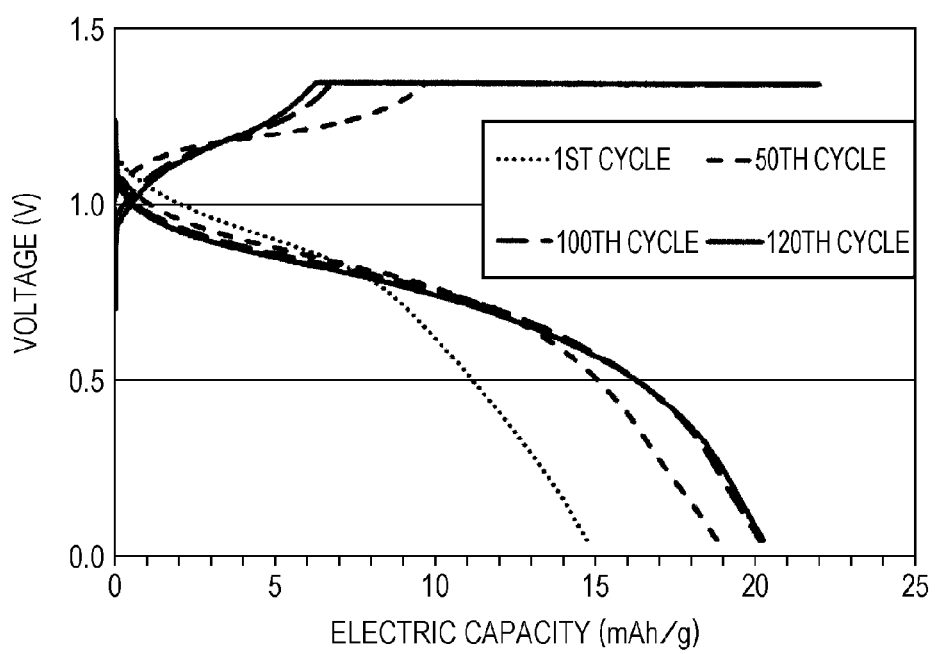
FIG. 5 is a graph showing changes in voltage and electric capacity during the charge and discharge of the aluminum secondary battery of Example 1.

FIG. 5 is a graph showing the voltage characteristics during the charge-discharge cycles. FIG. 5 shows that the resulting battery can be reversibly and repeatedly charged and discharged. The capacity at the low-slope part observed between about 1 volt and about 0.5 volts during the discharge increases as the number of cycles increases.

Figure 6:
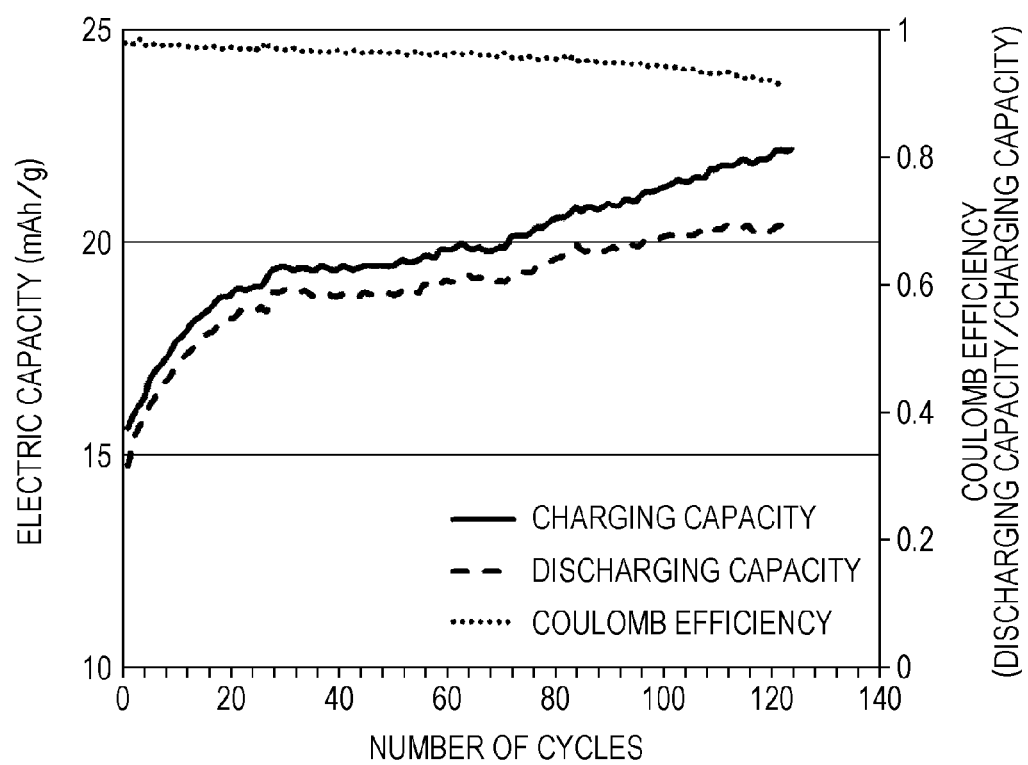
FIG. 6 is a graph showing changes in electric capacity and coulomb efficiency during the charge and discharge of the aluminum secondary battery of Example 1.

FIG. 6 is a graph showing changes in electric capacity and coulomb efficiency during the charge-discharge cycles. FIG. 6 shows that as the number of cycles increases, the coulomb efficiency tends to decrease, but the charging capacity and the discharging capacity both increase, so that the capacity can be expected to finally reach 95 milliamperes hour/gram, which is the theoretical capacity of the positive electrode 11 containing polyaniline.

Figure 7:
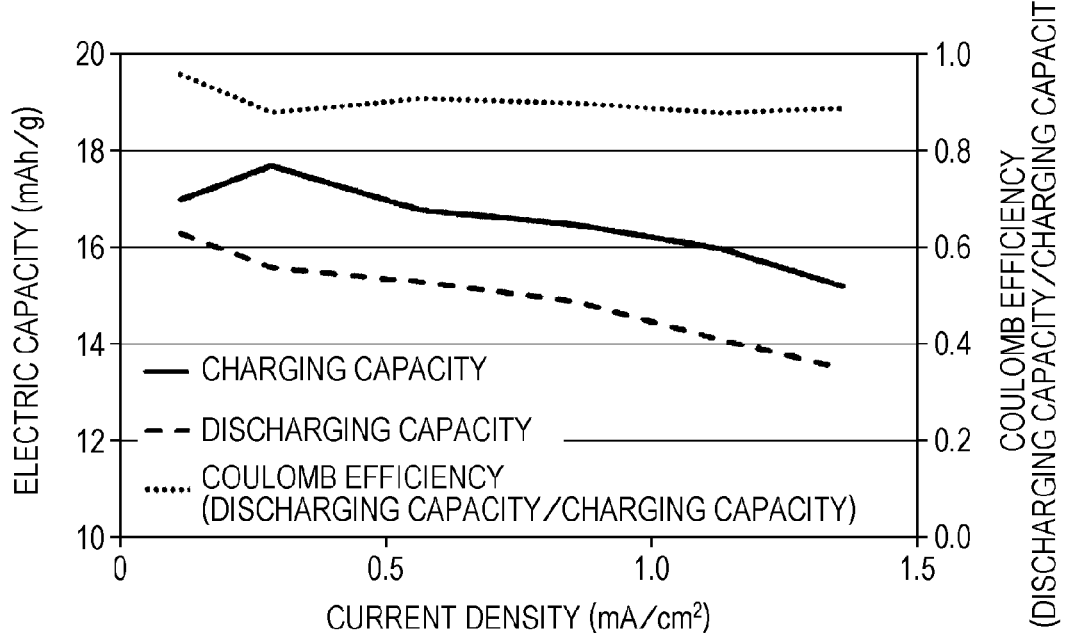
FIG. 7 is a graph showing changes in electric capacity and coulomb efficiency with respect to the current density of the aluminum secondary battery of Example 1.

FIG. 7 is a graph showing changes in electric capacity and coulomb efficiency at different current densities. FIG. 7 shows that as the current density increases, the charging capacity and the discharging capacity both decrease, but the coulomb efficiency almost does not change, which suggests that the discharging rate should be equal to or higher than the charging rate.

Figure 8:
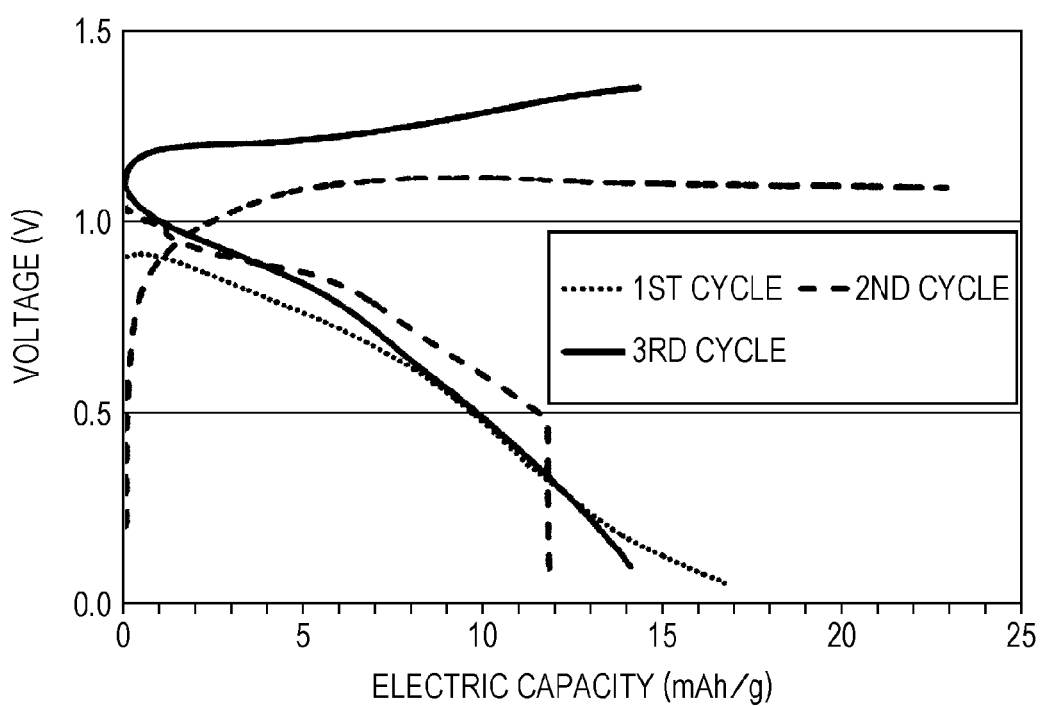
FIG. 8 is a graph showing changes in voltage and electric capacity during the charge and discharge of an aluminum secondary battery of Example 2.

FIG. 8 is a graph showing the voltage characteristics during the charge and discharge of the aluminum secondary battery of Example 2 using undoped, oxidized polyaniline. As shown in FIG. 8, at the second cycle charge, the voltage started to decrease during the charge, and therefore, the charge was switched to the discharge.

Figure 9:
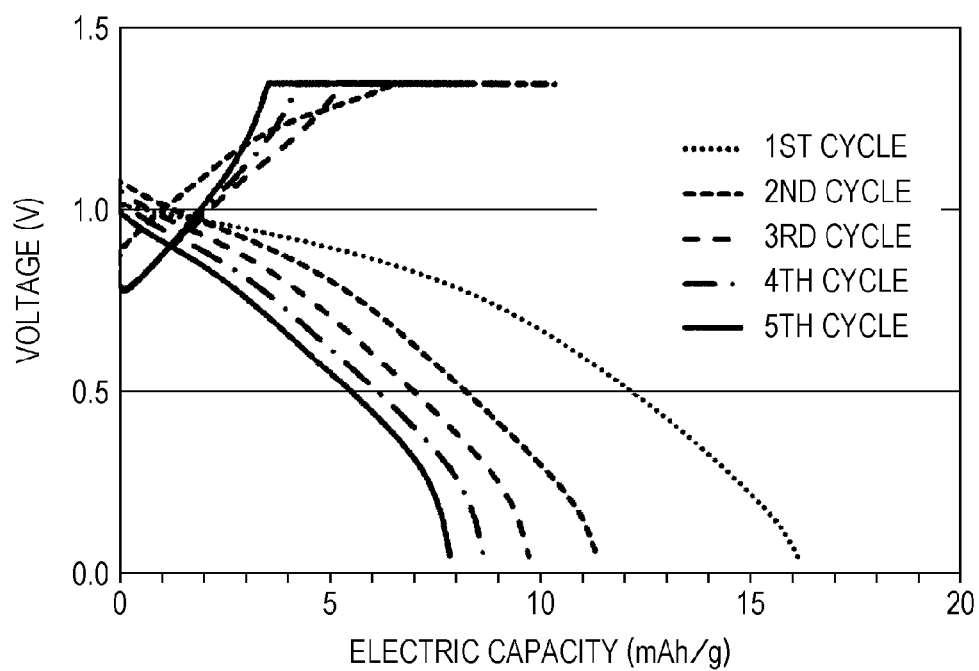
FIG. 9 is a graph showing changes in voltage and electric capacity during the charge and discharge of an aluminum secondary battery of Example 3.

FIG. 9 is a graph showing the voltage characteristics during the charge and discharge of the aluminum secondary battery of Example 3 using p-toluenesulfonic acid-doped, oxidized polyaniline.

Figure 10:
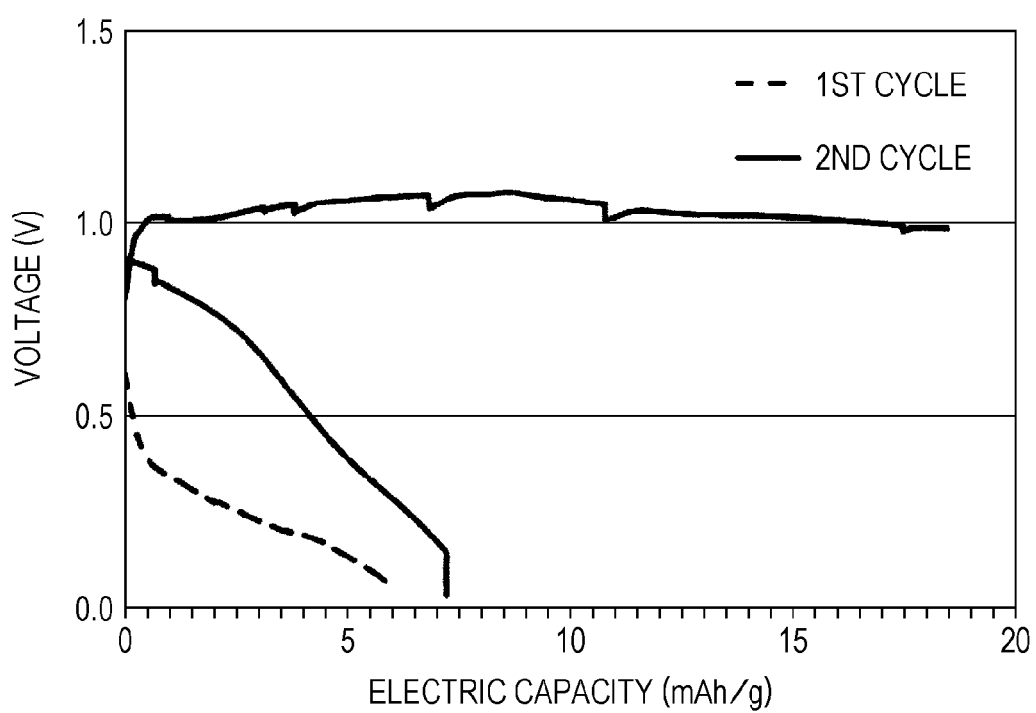
FIG. 10 is a graph showing changes in voltage and electric capacity during the charge and discharge of an aluminum secondary battery of Example 4.

FIG. 10 is a graph showing the voltage characteristics during the charge and discharge of the aluminum secondary battery of Example 4 using undoped, reduced polyaniline. As shown in FIG. 10, at the second cycle charge, the voltage started to decrease during the charge, and therefore, the charge was switched to the discharge.

As an example, FIG. 1 shows the charge and discharge reactions of the aluminum secondary battery of Example 1. As shown in FIG. 1, the aluminum secondary battery includes the positive electrode 11, the negative electrode 12, and the electrolyte in contact with the positive and negative electrodes 11 and 12. The oxidized polyaniline in the positive electrode 11 is in a charged state. As the discharge proceeds, the oxidized polyaniline releases the dopant Cl$^-$. The released Cl$^-$ is consumed by equilibrium reactions with $Al_2Cl_7^-$, $AlCl_4^-$, and $[Al(EnPS)_3]^{3+}$ in the electrolyte, so that uneven distribution of charges in the electrolyte is less likely to occur, which would otherwise be caused by local increase of Cl$^-$ in the vicinity of the positive electrode 11. On the negative electrode 12 side, aluminum dissolves to form an aluminum complex having Cl$^-$ or EnPS as a ligand. Cl$^-$ or EnPS, which is used in the coordination to aluminum, is also lessened by equilibrium reactions with $AlCl_4^-$, $Al_2Cl_7^-$, and $[Al(EnPS)_3]^{3+}$. The uneven charge distribution caused by the aluminum dissolution is also lessened by the same equilibrium process. Therefore, localization of electrolyte charges in the vicinity of the negative electrode 12 is also less likely to occur. During the charge, the positive electrode 11 is doped with Cl$^-$ on the positive electrode 11 side, and aluminum metal is deposited on the negative electrode 12. Uneven distribution of charges in the electrolyte, which occurs at both electrodes due to decrease of Cl$^-$ or Al$^{3+}$, is also lessened by the same equilibrium reactions as in the discharge. During the discharge, Cl$^-$ and Al$^{3+}$ in the electrolyte increases and decreases, respectively. During the charge, however, the concentration change occurs in a manner reverse to that during the discharge. Therefore, the charge-discharge process does not change the composition of the electrolyte.

The aluminum secondary battery according to an embodiment as described above provides the following advantages. In the aluminum secondary battery, the electrolyte including the aluminum salt, the sulfone, and the solvent with a dielectric constant of 20 or less is not corrosive to metal materials such as SUS, which makes it possible to easily produce coin cells whose casing member and the like are made of a metal material such as SUS. The anion acceptor-containing positive electrode 11 is used in the aluminum secondary battery. Therefore, the aluminum secondary battery can be charged and discharged efficiently without the problem that when an oxide positive electrode is used, aluminum ions are strongly bonded to oxygen to interfere with efficient charge and discharge. These features make it possible to provide, in the form of a coin cell, a highly-efficient, ultra-high-capacity, aluminum secondary battery operable at room temperature.

The aluminum secondary battery can be used, for example, as a drive power source or an auxiliary power source for notebook personal computers, personal digital assistants (PDAs), mobile phones, codeless handsets, video movies, digital still cameras, digital books, electronic dictionaries, portable music players, radios, headphones, game machines, navigation systems, memory cards, cardiac pacemakers, acoustic aids, electric tools, electric shavers, refrigerators, air conditioners, televisions, stereos, water heaters, kitchen microwaves, dishwashers, washing machines, drying machines, lighting devices, toys, clinical instruments, robots, road conditioners, traffic signals, railway vehicles, golf carts, electric carts, and electric cars (including hybrid cars). The aluminum secondary battery can also be installed in power storage sources for buildings such as housings or power facilities or can be used to supply power thereto. In electric cars, motors are generally used as converters for receiving electric power and converting the electric power to mechanical drive power. Control devices for processing information about vehicle control include control devices for displaying remaining battery power based on the information about the remaining battery power. The aluminum secondary battery can also be used as an electrical storage device in what are called smart grids. Such an electrical storage device can not only supply power but also store power by receiving power from other power sources. Examples of other power sources that may be used include thermal power generation, atomic power generation, hydraulic power generation, solar cells, wind power generation, geothermal power generation, fuel cells (including biofuel cells), etc.

While the present disclosure has been described based on embodiments and examples, it will be understood that these embodiments and examples are not intended to limit the present disclosure and that various modifications of these embodiments and examples are possible. The values, structures, configurations, shapes, materials, and other features shown in the embodiments and examples are only by way of example, and if necessary, values, structures, configurations, shapes, materials, and other features different from the above may also be used.

The present disclosure may have the following features.

[1] <<Aluminum Secondary Battery>>

An aluminum secondary battery including: a positive electrode; a negative electrode including at least aluminum; and an electrolyte, wherein the electrolyte includes an aluminum salt, a sulfone, and a solvent with a dielectric constant of 20 or less, and the positive electrode includes an anion receptor.

[2] The aluminum secondary battery according to [1], wherein the anion receptor is at least one selected from the group consisting of a p-type conductive polymer, a metal complex having a structure that allows halogen to be coordinated to or detached from a metal moiety, and a metal oxide having a structure that allows chlorine to be coordinated to or detached from a metal moiety.

[3] The aluminum secondary battery according to [2], wherein the p-type conductive polymer is at least one selected from the group consisting of polyaniline, polypyrrole, polyacetylene, polyparaphenylene, polythiophene, polyacene, and derivatives thereof, the metal complex is at least one selected from the group consisting of metalloporphyrin, wherein metal is V, Mn, Fe, Co, Ni, or Cu, metallophthalocyanine, derivatives thereof, and polymers thereof, and the metal oxide is at least one selected from the group consisting of $V_2O_3$, MnO, FeO, CoO, NiO, and $Cu_2O$.

[4] The aluminum secondary battery according to any one of [1] to [3], wherein the sulfone is an alkyl sulfone represented by $R_1R_2SO_2$, wherein $R_1$ and $R_2$ each represent an alkyl group, or an alkyl sulfone derivative.

[5] The aluminum secondary battery according to [4], wherein the alkyl sulfone is at least one selected from the group consisting of dimethylsulfone, methyl ethyl sulfone, methyl n-propyl sulfone, methyl isopropyl sulfone, methyl n-butyl sulfone, methyl isobutyl sulfone, methyl sec-butyl sulfone, methyl tert-butyl sulfone, ethyl methyl sulfone, diethylsulfone, ethyl n-propyl sulfone, ethyl isopropyl sulfone, ethyl n-butyl sulfone, ethyl isobutyl sulfone, ethyl sec-butyl sulfone, ethyl tert-butyl sulfone, di-n-propylsulfone, diisopropylsulfone, n-propyl n-butyl sulfone, n-butyl ethyl sulfone, isobutyl ethyl sulfone, sec-butyl ethyl sulfone, and di-n-butylsulfone, and the alkyl sulfone derivative is ethyl phenyl sulfone.

[6] The aluminum secondary battery according to any one of [1] to [5], wherein the content of the solvent in the electrolyte is from 30% by mole to less than 88% by mole, and the molar ratio of the aluminum salt to the sulfone is from 4/5 to less than 7/3.

[7] The aluminum secondary battery according to any one of [1] to [5], wherein the content of the solvent in the electrolyte is from 30% by mole to 84% by mole, and the molar ratio of the aluminum salt to the sulfone is from 4/5 to 5/3.

[8] The aluminum secondary battery according to any one of [1] to [7], wherein the solvent has a dielectric constant of 10 or less.

[9] The aluminum secondary battery according to any one of [1] to [7], wherein the solvent is an aromatic hydrocarbon.

[10] The aluminum secondary battery according to any one of [1] to [9], wherein the solvent is at least one selected from the group consisting of benzene, toluene, ethylbenzene, o-xylene, m-xylene, p-xylene, and 1-methylnaphthalene.

[11] <<Electronic Device>>

An electronic device including at least one aluminum secondary battery, wherein the aluminum secondary battery includes a positive electrode, a negative electrode including at least aluminum, and an electrolyte, wherein the electrolyte includes an aluminum salt, a sulfone, and a solvent with a dielectric constant of 20 or less, and the positive electrode includes an anion receptor.

[12] <<Electronic Device>>

An electronic device configured to receive electric power from an aluminum secondary battery, wherein the aluminum secondary battery includes a positive electrode, a negative electrode including at least aluminum, and an electrolyte, wherein the electrolyte includes an aluminum salt, a sulfone, and a solvent with a dielectric constant of 20 or less, and the positive electrode includes an anion receptor.

[13] <<Battery Pack>>

A battery pack including: an aluminum secondary battery; a control unit configured to perform control for the aluminum secondary battery; and a casing configured to contain the aluminum secondary battery, wherein the aluminum secondary battery includes a positive electrode, a negative electrode including at least aluminum, and an electrolyte, wherein the electrolyte includes an aluminum salt, a sulfone, and a solvent with a dielectric constant of 20 or less, and the positive electrode includes an anion receptor.

[14] <<Electrically Driven Vehicle>>

An electrically driven vehicle including: an converter configured to receive electric power from an aluminum secondary battery and convert the electric power to mechanical drive power for the vehicle; and a control device configured to process information about vehicle control based on information about the aluminum secondary battery, wherein the aluminum secondary battery includes a positive electrode, a negative electrode including at least aluminum, and an electrolyte, wherein the electrolyte includes an aluminum salt, a sulfone, and a solvent with a dielectric constant of 20 or less, and the positive electrode includes an anion receptor.

[15] <<Power System>>

A power system configured to receive electric power from an aluminum secondary battery and/or to supply electric power from a power source to the aluminum secondary battery, wherein the aluminum secondary battery includes a positive electrode, a negative electrode including at least aluminum, and an electrolyte, wherein the electrolyte includes an aluminum salt, a sulfone, and a solvent with a dielectric constant of 20 or less, and the positive electrode includes an anion receptor.

[16] <<Power Source for Use in Power Storage>>

A power source for use in power storage, the power source including an aluminum secondary battery and being configured to be connected to an electronic device to which electric power is to be supplied, wherein the aluminum secondary battery includes a positive electrode, a negative electrode including at least aluminum, and an electrolyte, wherein the electrolyte includes an aluminum salt, a sulfone, and a solvent with a dielectric constant of 20 or less, and the positive electrode includes an anion receptor.

REFERENCE SIGNS LIST

11 Positive electrode
11a Positive electrode-side collector
11b Positive electrode active material layer
12 Negative electrode
12a Negative electrode-side collector
12b Negative electrode active material layer
13 Separator
14 Casing can
15 Casing cup
16 Gasket

The invention claimed is:

1. An aluminum secondary battery, comprising:
a positive electrode;
a negative electrode including at least aluminum; and an electrolyte,
wherein the electrolyte includes an aluminum salt, a sulfone, and a solvent with a dielectric constant of at most 20,
wherein the positive electrode includes an anion receptor, and
wherein the anion receptor is at least one selected from the group consisting of a metal complex that allows halogen to be coordinated to or detached from a metal moiety based on an oxidation-reduction reaction in the aluminum secondary battery when the aluminum secondary battery is charged and discharged and a metal oxide that allows chlorine to be coordinated to or detached from the metal moiety based on the oxidation-reduction reaction in the aluminum secondary battery when the aluminum secondary battery is charged and discharged.

2. The aluminum secondary battery according to claim 1, wherein the anion receptor further consists of a p-type conductive polymer.

3. The aluminum secondary battery according to claim 2, wherein
the p-type conductive polymer is at least one selected from the group consisting of polyaniline, polypyrrole, polyacetylene, polyparaphenylene, polythiophene, polyacene, and derivatives thereof,
a metal of the metal complex is V, Mn, Fe, Co, Ni, or Cu, and
the metal oxide is at least one selected from the group consisting of $V_2O_3$, MnO, FeO, CoO, NiO, and $Cu_2O$.

4. The aluminum secondary battery according to claim 3, wherein the sulfone is an alkyl sulfone represented by $R_1R_2SO_2$, wherein $R_1$ and $R_2$ each represent an alkyl group, or an alkyl sulfone derivative.

5. The aluminum secondary battery according to claim 4, wherein
the alkyl sulfone is at least one selected from the group consisting of dimethylsulfone, methyl ethyl sulfone, methyl n-propyl sulfone, methyl isopropyl sulfone, methyl n-butyl sulfone, methyl isobutyl sulfone, methyl sec-butyl sulfone, methyl tert-butyl sulfone, ethyl methyl sulfone, diethylsulfone, ethyl n-propyl sulfone, ethyl isopropyl sulfone, ethyl n-butyl sulfone, ethyl isobutyl sulfone, ethyl sec-butyl sulfone, ethyl tert-butyl sulfone, di-n-propylsulfone, diisopropylsulfone, n-propyl n-butyl sulfone, n-butyl ethyl sulfone, isobutyl ethyl sulfone, sec-butyl ethyl sulfone, and di-n-butylsulfone, and
the alkyl sulfone derivative is ethyl phenyl sulfone.

6. The aluminum secondary battery according to claim 5, wherein a proportion of the solvent in the electrolyte is from 30% by mole to less than 88% by mole, and a molar ratio of the aluminum salt to the sulfone is from 4/5 to less than 7/3.

7. The aluminum secondary battery according to claim 6, wherein the proportion of the solvent in the electrolyte is from 30% by mole to 84% by mole, and the molar ratio of the aluminum salt to the sulfone is from 4/5 to 5/3.

8. The aluminum secondary battery according to claim 1, wherein the solvent has the dielectric constant of at most 10.

9. The aluminum secondary battery according to claim 1, wherein the solvent is an aromatic hydrocarbon.

10. The aluminum secondary battery according to claim 1, wherein the solvent is at least one selected from the group consisting of benzene, toluene, ethylbenzene, o-xylene, m-xylene, p-xylene, and 1-methylnaphthalene.

11. The aluminum secondary battery according to claim 1, wherein the metal complex is a metalloporphyrin.

12. An electronic device, comprising: at least one aluminum secondary battery,
wherein the aluminum secondary battery includes a positive electrode, a negative electrode including at least aluminum, and an electrolyte,
wherein the electrolyte includes an aluminum salt, a sulfone, and a solvent with a dielectric constant of at most 20,
wherein the positive electrode includes an anion receptor, and
wherein the anion receptor is at least one selected from the group consisting of a metal complex that allows halogen to be coordinated to or detached from a metal moiety based on an oxidation-reduction reaction in the aluminum secondary battery when the aluminum secondary battery is charged and discharged and a metal oxide that allows chlorine to be coordinated to or detached from the metal moiety based on the oxidation-reduction reaction in the aluminum secondary battery when the aluminum secondary battery is charged and discharged.

* * * * *